(12) United States Patent
Ozdemir et al.

(10) Patent No.: US 10,545,252 B2
(45) Date of Patent: Jan. 28, 2020

(54) DEGHOSTING AND INTERPOLATING SEISMIC DATA

(75) Inventors: Ahmet Kemal Ozdemir, Cambridge (GB); Philippe Caprioli, Gatwick (GB); Ali Ozbek, Cambridge (GB); Dirk-Jan Van Manen, Otelfingen (CH); Massimiliano Vassallo, Houston, TX (US)

(73) Assignee: WESTERNGECO L.L.C., Houston, TX (US)

( * ) Notice: Subject to any disclaimer, the term of this patent is extended or adjusted under 35 U.S.C. 154(b) by 473 days.

(21) Appl. No.: 12/688,391

(22) Filed: Jan. 15, 2010

(65) Prior Publication Data

US 2011/0178714 A1 Jul. 21, 2011

(51) Int. Cl.
*G01V 1/28* (2006.01)
*G06F 17/18* (2006.01)
*G06F 19/00* (2018.01)
*G01V 1/36* (2006.01)

(52) U.S. Cl.
CPC .......... *G01V 1/364* (2013.01); *G01V 1/28* (2013.01); *G01V 1/282* (2013.01); *G01V 2210/34* (2013.01); *G01V 2210/56* (2013.01); *G01V 2210/57* (2013.01)

(58) Field of Classification Search
CPC ...... G01V 1/28; G01V 1/282; G01V 2210/56; G01V 2210/34; G01V 1/364; G01V 2210/57
See application file for complete search history.

(56) References Cited

U.S. PATENT DOCUMENTS

| | | | |
|---|---|---|---|
| 5,852,588 A | 12/1998 | Hoop et al. | |
| 6,775,618 B1 | 8/2004 | Robertsson et al. | |
| 7,477,992 B2 | 1/2009 | Deffenbaugh et al. | |
| 7,986,586 B2 * | 7/2011 | van Borselen | G01V 1/20 367/24 |
| 8,116,166 B2 | 2/2012 | Robertsson et al. | |
| 8,554,484 B2 | 10/2013 | Van Manen et al. | |
| 8,699,297 B2 | 4/2014 | Ozdemir et al. | |
| 2006/0291328 A1 * | 12/2006 | Robertsson | G01V 1/36 367/24 |
| 2008/0275649 A1 * | 11/2008 | Ozdemir et al. | 702/14 |
| 2008/0312878 A1 | 12/2008 | Robertsson et al. | |
| 2009/0022009 A1 | 1/2009 | Ozdemir et al. | |
| 2009/0135670 A1 * | 5/2009 | Deffenbaugh et al. | 367/43 |

(Continued)

FOREIGN PATENT DOCUMENTS

EP 2060934 A1 5/2009
WO 2010093739 A2 8/2010

OTHER PUBLICATIONS

Zhang et al., Wave equation resampling of unevenly spaced traces, Nov. 17, 1997, pp. 263-271 (Year: 1997).*

(Continued)

*Primary Examiner* — Sujoy K Kundu
*Assistant Examiner* — L. Anderson (57) ABSTRACT

A technique includes receiving seismic data indicative of measurements acquired by seismic sensors. The measurements are associated with a measurement noise. The technique includes estimating at least one characteristic of the measurement noise and deghosting the seismic data based at least in part on the estimated characteristic(s) of the measurement noise.

16 Claims, 5 Drawing Sheets

(56) References Cited

U.S. PATENT DOCUMENTS

2009/0281732 A1* 11/2009 Turnbull .................... 702/17
2009/0296523 A1* 12/2009 Ozbek et al. ................ 367/38

OTHER PUBLICATIONS

Extended European Search Report issued in related EP application 11733326.0 dated May 4, 2016, 11 pages.
First Examination Report in related AU application 2015224508 dated Apr. 14, 2016, 3 pages.
European Search Report issued in related EP application 11733326.0 dated May 27, 2015, 5 pages.
International Search Report and Written Opinion issued in related PCT application PCT/US2011/021008 dated Aug. 30, 2011, 8 pages.
Office Action No. 63096 issued in related MX application MX/a/2012/008198 dated Jul. 8, 2013, 7 pages.
Examination Report issued in related AU Application No. 2011205327 dated Jul. 3, 2015 (2 pages).
Official Action issued in related MX Application No. MX/a/2012/008198 dated Dec. 5, 2013, with partial English translation by Agent (9 pages).
International search report and written opinion for the equivalent PCT patent application No. PCT/US2011/021008 dated Aug. 30, 2011.
Office Action for the equivalent Mexican patent application No. MX/a/2012/008198 dated Oct. 22, 2013.
Partial search report for the equivalent European patent application No. 11733326.0 dated May 27, 2015.
Examination Report for the equivalent Indian patent application No. 6177/CHENP/2012 dated Mar. 23, 2018.
International Preliminary Report on Patentability issued in the related PCT Application PCT/US2011/021008, dated Jul. 11, 2012 (5 pages).
Examination Report issued in the related AU Application 2011205327, dated Sep. 12, 2014 (3 pages).

* cited by examiner

DEGHOSTING AND INTERPOLATING SEISMIC DATA

BACKGROUND

The invention generally relates to deghosting and interpolating seismic data.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation reflect, refract or scatter the seismic waves, changing their direction of propagation and other properties. Part of the energy emitted by the sources reaches the seismic sensors. Some seismic sensors are sensitive to pressure changes (hydrophones), others to particle motion (e.g., geophones and/or accelerometers), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes receiving seismic data indicative of measurements acquired by seismic sensors. The measurements are associated with a measurement noise. The technique includes estimating at least one characteristic of the measurement noise and deghosting the seismic data based at least in part on the estimated characteristic(s) of the measurement noise.

In another embodiment of the invention, a system includes an interface and a processor. The interface receives seismic data indicative of measurements acquired by seismic sensors. The measurements are associated with a measurement noise. The processor is adapted to process the seismic data to estimate at least one characteristic of the measurement noise and deghost the seismic data based at least in part on the estimated characteristic(s) of the measurement noise.

In yet another embodiment of the invention, an article includes a computer readable storage medium storing instructions that when executed by a computer cause the computer to receive seismic data indicative of measurements acquired by seismic sensors. The measures are associated with the measurement noise. The instructions when executed by the computer cause the computer to estimate at least one characteristic of the measurement noise and deghost the seismic data based at least in part on the estimated characteristic(s) of the measurement noise.

Advantages and other features of the invention will become apparent from the following drawing, description and claims.

DETAILED DESCRIPTION

Figure 1:
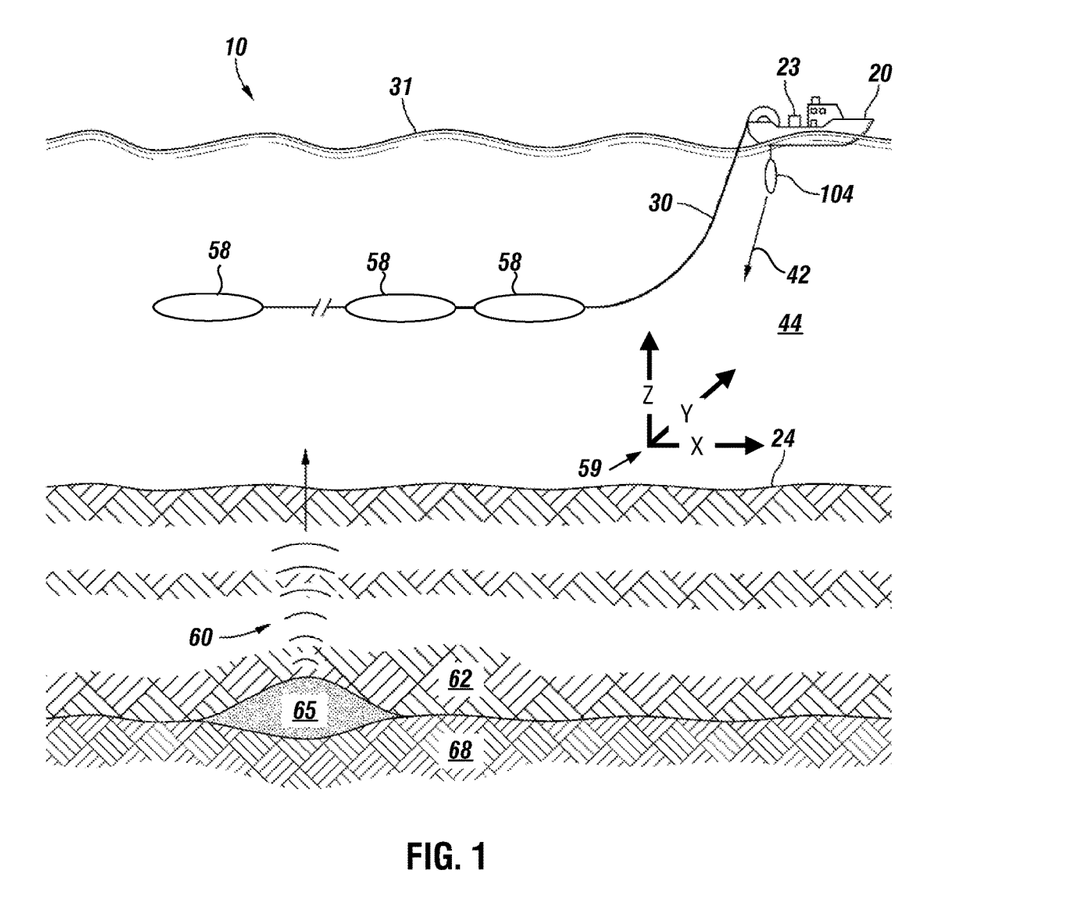
FIG. 1 is a schematic diagram of a marine-based seismic data acquisition system according to an embodiment of the invention.

FIG. 1 depicts an embodiment 10 of a marine seismic data acquisition system in accordance with some embodiments of the invention. In the system 10, a survey vessel 20 tows a spread of one or more seismic streamers 30 (one exemplary streamer 30 being depicted in FIG. 1) behind the vessel 20. As non-limiting examples, the seismic spread may be formed from streamers 30 that are towed at different depths (such as an over/under spread, for example), in accordance with some embodiments of the invention; and the seismic spread may be formed from streamers 30 that are generally towed at the same depth, in accordance with other embodiments of the invention. The seismic streamers 30 may each be several thousand meters long and contain various support cables (not shown), as well as wiring and/or circuitry (not shown) that may be used to support communication along the streamers 30. In general, each streamer 30 includes a primary cable into which is mounted seismic sensors 58 that record seismic signals.

In accordance with embodiments of the invention, the seismic sensors 58 may be multi-component seismic sensors, where each sensor 58 is capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component sensor 58 may include one or more hydrophones, geophones, particle displacement sensors, particle velocity sensors, accelerometers, pressure gradient sensors, or combinations thereof.

For example, in accordance with some embodiments of the invention, a particular sensor 58 may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

The marine seismic data acquisition system 10 includes at least one seismic source 104 that may be formed from one or more seismic source elements, such as air guns, for example, which are connected to the survey vessel 20. Alternatively, in other embodiments of the invention, the seismic source(s) 104 may operate independently of the survey vessel 20, in that the seismic source(s) 104 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source(s) 104 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the seismic source(s) 40 produce corresponding reflected acoustic signals, or pressure waves 60, which are sensed by the seismic sensors 58. It is noted that the pressure waves that are received and sensed by the seismic sensors 58 include "upgoing" pressure waves that propagate to the sensors 58 without reflection, as well as "downgoing" pressure waves that are produced by reflections of the pressure waves 60 from an air-water boundary 31.

The seismic sensors 58 generate signals (digital signals, for example), called "traces," which indicate the acquired measurements of the pressure wavefield and particle motion (if the sensors are particle motion sensors) and form the corresponding seismic data. The seismic data are recorded and may be at least partially processed by a signal processing unit 23 that is deployed on the survey vessel 20, in accordance with some embodiments of the invention. For example, a particular multi-component seismic sensor may provide a trace, which corresponds to a measure of a pressure wavefield by its hydrophone; and the sensor may provide one or more traces that correspond to one or more components of particle motion, which are measured by its accelerometers.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23.

The process of decomposing a recorded wavefield into its upgoing and downgoing components is often referred to as wavefield separation, or "deghosting." The deghosting relies on particle motion measurements, such as measurements by particle velocity sensors, such that the pressure and particle motion measurements may be combined to obtain "ghost free" data, or the upgoing seismic wavefield (the upgoing pressure wavefield, for example).

In accordance with embodiments of the invention, techniques and systems are described herein for jointly deghosting and interpolating seismic data. Thus, the techniques and systems that are disclosed herein process seismic data that are indicative of samples of pressure and particle motion wavefields acquired by the seismic sensors 58 to generate data, which are generally indicative of an upgoing wavefield (a pressure wavefield, for example) at sensor and non-sensor locations. More specifically, the techniques and systems that are described herein solve the joint interpolation and deghosting problem for a finite number of samples, which are taken at unevenly spaced receiver positions for purposes of providing an interpolated and unbiased estimate of an upgoing wavefield. The unevenly spaced receiver positions may be located in the cross-line direction where the average sensor spacing is usually large and the seismic signal is aliased.

In the frequency-wavenumber-space (f–$k_x$–y) domain, the acquired total pressure and particle motion measurements may be expressed as follows:

$$M_P(f, k_x, y) = \int_{-\infty}^{\infty} g_P(f, k_x, y - y') P_U(f, k_x, y') dy' + N_P(f, k_x, y), \quad \text{Eq. 1}$$

$$M_Z(f, k_x, y) = \int_{-\infty}^{\infty} g_Z(f, k_x, y - y') P_U(f, k_x, y') dy' + N_Z(f, k_x, y), \quad \text{Eq. 2}$$

$$M_Y(f, k_x, y) = \int_{-\infty}^{\infty} g_Y(f, k_x, y - y') P_U(f, k_x, y') dy' + N_Y(f, k_x, y), \quad \text{Eq. 3}$$

and $$M_X(f, k_x, y) = \int_{-\infty}^{\infty} g_X(f, k_x, y - y') P_U(f, k_x, y') dy' + N_X(f, k_x, y), \quad \text{Eq. 4}$$

where "$k_x$" represents the inline wavenumbers; "f" represents frequency; "$M_P(f,k_x, y)$" represents the total pressure measurement; "$M_Z(f, k_x, y)$" "$M_Y(f, k_x, y)$" and "$M_X(f, k_x, y)$," represent the total particle motion measurements along the vertical (z), crossline (y) and inline (x) directions, respectively; "$g_P(f, k_x, y)$," "$g_Z(f, k_x, y)$," "$g_Y(f, k_x, y)$" and "$g_X(f, k_x, y)$" represent the corresponding pressure and particle motion ghost operators; "$N_P(f, k_x, y)$," "$N_Z(f, k_x, y)$," "$N_Y(f, k_x, y)$" and "$N_X(f, k_x, y)$," represent the corresponding measurement noises; and "$P_U(f, k_x, y)$" represents the upgoing component of the pressure wavefield at the streamer depth (called "$z_s$" herein). It is to be noted that, the total pressure and particle motion measurement could be represented in terms of other directional components of the seismic wavefield, for instance, the downgoing wavefield, without limiting the scope of the invention.

The frequency-wavenumber-wavenumber (f–$k_x$–$k_y$) domain expressions for the ghost operators may be written in terms of the vertical wavenumber $k_z$ and the streamer depth $z_s$ as follows:

$$G_P(f, k_x, k_y) = 1 - e^{-j4\pi k_z z_s}, \quad \text{Eq. 5}$$

$$G_z(f, k_x, k_y) = \frac{ck_z}{f}(1 + e^{-j4\pi k_z z_s}), \quad \text{Eq. 6}$$

$$G_y(f, k_x, k_y) = \frac{ck_y}{f}(1 - e^{-j4\pi k_z z_s}), \text{ and} \quad \text{Eq. 7}$$

$$G_x(f, k_x, k_y) = \frac{ck_x}{f}(1 - e^{-j4\pi k_z z_s}), \quad \text{Eq. 8}$$

where as a convention the streamer depth $z_s$ has positive sign when the streamer is below sea surface, and "$k_z$" represents the vertical wavenumber, which is a function of the inline wave number $k_x$, a crossline wavenumber (called "$k_y$"), the acoustic speed of the sound in water (called "c") and the frequency f, as described below:

$$k_z = \pm\sqrt{\frac{f^2}{c^2} - (k_x^2 + k_y^2)}. \quad \text{Eq. 9}$$

According to the convention that is used herein, the sign of the vertical wavenumber $k_z$ is positive for wavefields traveling in the direction from the sea floor to the sea surface. Otherwise, the sign of the vertical wavenumber $k_z$ is negative.

The convolution operations may be discretized by using the uniformly-spaced samples of the ghost operator and the upgoing pressure wavefield at the Nyquist wavenumber sampling rate. Assuming that unevenly, or irregularly, placed crossline sensor coordinates are denoted by "$y_n$," (where n is equal to 1, 2, ... $N_s$), the acquired seismic data may be approximated as follows:

$$M_P(f, k_x, y_n) \cong \quad \text{Eq. 10}$$
$$\sum_{m'=a}^{b-1} g_P(f, k_x, y_n - n'\Delta_y)P_U(f, k_x, n'\Delta_y) + N_P(f, k_x, y_n),$$

$$M_Z(f, k_x, y_n) \cong \quad \text{Eq. 11}$$
$$\sum_{m'=a}^{b-1} g_Z(f, k_x, y_n - n'\Delta_y)P_U(f, k_x, n'\Delta_y) + N_Z(f, k_x, y_n),$$

$$M_Y(f, k_x, y_n) \cong \quad \text{Eq. 12}$$
$$\sum_{m'=a}^{b-1} g_Y(f, k_x, y_n - n'\Delta_y)P_U(f, k_x, n'\Delta_y) + N_Y(f, k_x, y_n),$$

and $$M_X(f, k_x, y_n) \cong \quad \text{Eq. 13}$$
$$\sum_{m'=a}^{b-1} g_X(f, k_x, y_n - n'\Delta_y)P_U(f, k_x, n'\Delta_y) + N_X(f, k_x, y_n),$$

where "$\Delta_y$" represents the sampling spacing, and the range of the summations are determined by the variables called "a" and "b." The range of summation is chosen such that the crossline sensor coordinates $y_n$ reside within the interval [$a\Delta y$, $b\Delta y$].

Using matrix notation, Eqs. 10-13 may be written more compactly as follows:

$$M_P = G_P P_U + N_P, \quad \text{Eq. 14}$$

$$M_Z = G_Z P_U + N_Z, \quad \text{Eq. 15}$$

$$M_Y = G_Y P_U + N_Y, \text{ and} \quad \text{Eq. 16}$$

$$M_X = G_X P_U + N_X, \quad \text{Eq. 17}$$

where "$P_U$" represents a (b−a)×1 dimensional vector whose entries are the uniformly spaced samples of the upgoing pressure wavefield; "$G_P$," "$G_Z$," "$G_Y$" and "$G_X$" are each a $N_S \times (b-a)$ dimensional convolution matrix, which corresponds to pressure and particle motion ghost operators; "$N_P$," "$N_Z$," "$N_Y$" and "$N_X$" are $N_s \times 1$ dimensional vectors whose entries are the unevenly spaced samples of the measurement noises on pressure and particle motion data; and "$M_P$," "$M_Z$," "$M_Y$" and "$M_X$" are each $N_S \times 1$ dimensional vectors whose entries are the unevenly spaced samples of the acquired pressure and particle motion wavefields at frequency f and inline wavenumber $k_x$.

Equations 14, 15, 16 and 17 may be written in a more compact form as follows:

$$M = GP_U + N, \quad \text{Eq. 18}$$

where "M," "G," and "N" are the concatenated vectors of the measured data, ghosting convolution matrices, and the measurement noise, respectively. These vectors may be expressed in expanded form as follows:

$$M = [M_P^T M_Z^T M_Y^T M_X^T]^T, \quad \text{Eq. 19}$$

$$G = [G_P^T G_Z^T G_Y^T G_X^T]^T, \text{ and} \quad \text{Eq. 20}$$

$$N = [N_P^T N_Z^T N_Y^T N_X^T]^T, \quad \text{Eq. 21}$$

where "T" denotes the matrix transpose operator.

The deghosting problem in the presence of measurement noise N may be defined as the solution to Eq. 18 when the measurement M has been acquired and the ghost operator G is known but the measurement noise N has not been directly measured. As described further below, in solving this problem, it is assumed that characteristics of the noise may be estimated, and these estimated characteristic(s) may then be used to determine the upgoing wavefield $P_U$. As non-limiting examples, characteristic(s) of the measurement noise N may be estimated from, for example, the portion of the seismic data before the arrival of the seismic signal or after the amplitude of the seismic signal has reduced to negligible levels.

Figure 2:
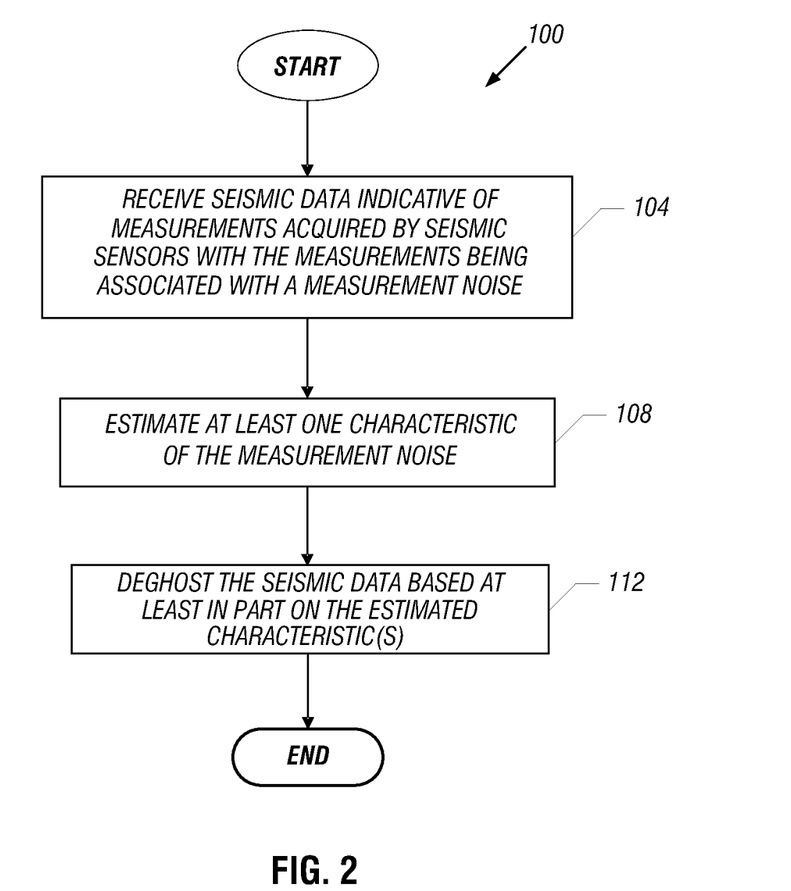
FIGS. 2, 3 and 4 are flow diagrams depicting techniques to deghost and interpolate seismic data according to embodiments of the invention.

Referring to FIG. 2, a technique 100 may be used in accordance with embodiments of the invention for purposes of processing acquired seismic data to jointly perform deghosting and interpolation. The technique 100 includes receiving (block 104) seismic data, which are indicative of measurements acquired by seismic sensors. The measurements are associated with a measurement noise. The technique 100 includes estimating (block 108) at least one characteristic of the measurement noise and deghosting (block 112) the seismic data based at least in part on the estimated characteristic(s) of the measurement noise. The deghosting produces data that are indicative of an upgoing wavefield at sensor and interpolated non-sensor locations.

One way to perform the joint deghosting and interpolation described above is to estimate a probability distribution of the measurement noise N and use this probability distribution to determine the upgoing pressure wavefield $P_U$. More specifically, a maximum likelihood estimate of the upgoing pressure wavefield $P_U$ based on the measurement model that is set forth in Eq. 18 may be found by maximizing the joint probability density function (pdf) of the measurement. It is reasonable to assume that the upgoing wavefield $P_U$ and the measurement noise N are statistically independent. Therefore, the joint probability density function of the measured data may be written in terms of the joint probability density function of the measurement noise, as described forth below:

$$f_M(P_U) = f_N(M - GP_U), \quad \text{Eq. 22}$$

where "$f_M(P_U)$" represents the joint probability density function of the measured data M and "$f_N(M-GP_U)$" represents the joint probability density function of the measurement noise N.

After the joint probability density function of the measurement noise N has been estimated, the maximum likelihood estimate of the upgoing wavefield $P_U$ may be determined by searching through candidate upgoing wavefields $P_U$ to find the candidate upgoing wavefield $P_U$ that maximizes the joint probability density function $f_N(M-GP_U)$. Mathematically, the maximization operation may be described as follows:

$$P_{U,MLE} = \max_P f_N(M - GP_U), \quad \text{Eq. 23}$$

where "$P_{U,\,MLE}$" represents the upgoing wavefield $P_U$ that maximizes the joint probability density function $f_N$ (M–GP$_U$). Alternatively, in accordance with other embodiments of the invention, an analytical model for the joint probability density function of the measurement noise N may be determined, and the parameters of the model may be estimated, or tuned, based on the acquired measurement noise N.

Figure 3:
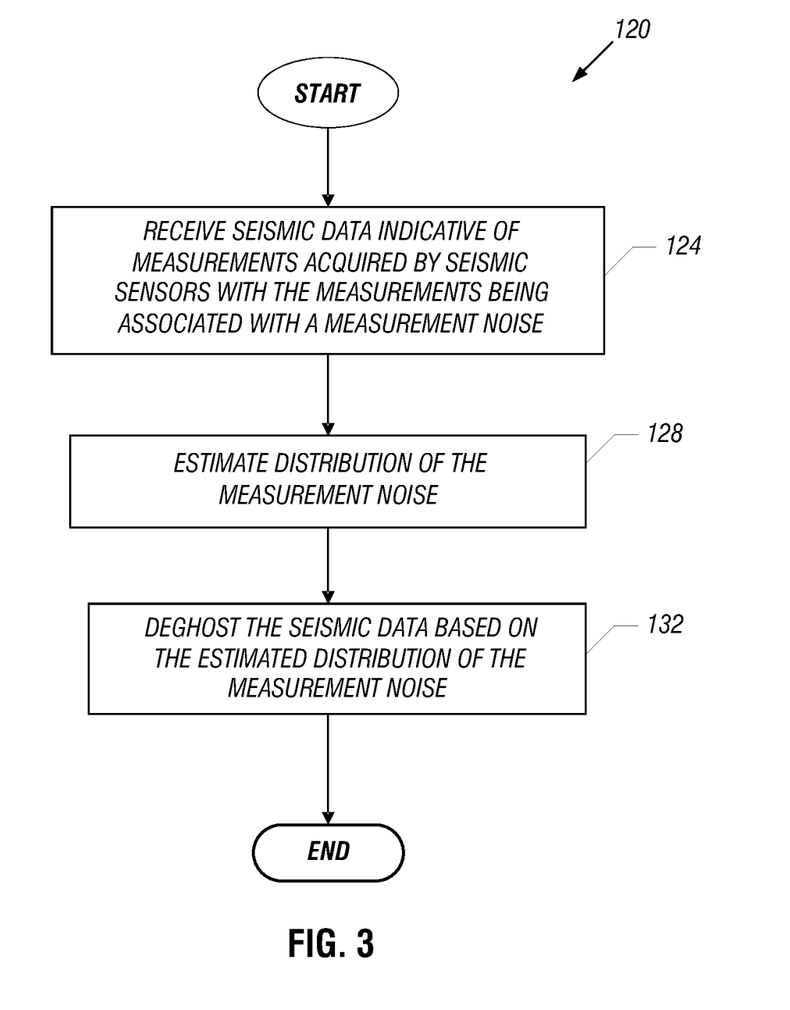

To summarize, FIG. 3 depicts a technique 120 that may be performed in accordance with some embodiments of the invention for purposes of deghosting and interpolating seismic data. Pursuant to the technique 120, seismic data, which are indicative of measurements that are acquired by seismic sensors are received (block 124) and a distribution of the noise measurement is estimated, pursuant to block 128. The seismic data are then deghosted based at least in part on the estimated distribution, pursuant to block 132.

Another way to deghost seismic data based on one or more characteristics of the measurement noise N is to estimate second order statistics of the noise. For example, in accordance with some embodiments of the invention, the mean and correlation of the measurement noise N are estimated from the acquired seismic data. Using the estimated statistics, a weighted least-squares estimate of the upgoing wavefield $P_U$ may then be determined. As a non-limiting example of one way to perform this technique, an exemplary cost function for the weighted least squares estimate may be expressed as follows:

$$J(P_U) = (M - GP_U)C_N^{-1}(M - GP_U), \quad \text{Eq. 24}$$

where "$P_U$" represents the cost function being minimized, and "$C_N$" represents the estimated covariance matrix of the measurement noise N. Because the cost function $J(P_U)$ is quadratic for the upgoing wavefield $P_U$, the minimization of the cost function $J(P_U)$ provides an analytical expression for the weighted least squares estimate, as set forth below:

$$P_{U,WLS} = (G^H C_N^{-1} G)^{-1} G^H C_N^{-1} M, \quad \text{Eq. 25}$$

where "$P_{U,WLS}$" represents the analytical expression for the upgoing wavefield $P_U$.

In the special case of uncorrelated noises on different type of sensors, the covariance matrix $C_N$ becomes block diagonal, and the estimate that is set forth in Eq. 25 may be simplified as follows:

$$P_{U,WLS} = \left( \sum_{\chi=p,z,y,x} G_\chi^H C_\chi^{-1} G_\chi \right)^{-1} \left( \sum_{\chi=p,z,y,x} G_\chi^H C_\chi^{-1} M_\chi \right), \quad \text{Eq. 26}$$

where "$\chi$" is an index to denote pressure or particle motion.

As can be seen from Eq. 26, in the weighted least-squares solution, each measurement is weighted with the inverse of the corresponding noise covariance matrix. In other words, the contributions of the noisier components to the estimate are de-emphasized.

The weighted least squares solution set forth above is unbiased, i.e., the following relationship holds:

$$P_{U,WLS} = P_U + N_{U,WLS}, \quad \text{Eq. 27}$$

where "$N_{U,WLS}$" represents the noise, or error, on the upgoing wavefield $P_U$. The $N_{U,WLS}$ noise may be described as follows:

$$N_{U,WLS} = \left( \sum_{\chi=p,z,y,x} G_\chi^H C_\chi^{-1} G_\chi \right)^{-1} \left( \sum_{\chi=p,z,y,x} G_\chi^H C_\chi^{-1} N_\chi \right). \quad \text{Eq. 28}$$

The covariance matrix of the estimation noise may be determined as follows:

$$C_{N_{U,WLS}} = \left( \sum_{\chi=p,z,y,x} G_\chi^H C_\chi^{-1} G_\chi \right)^{-1}, \quad \text{Eq. 29}$$

where "$C_{N_{U,WLS}}$" represents the covariance matrix of the estimation noise.

It is noted that when the seismic data are spatially aliased, the terms $G_\chi^H C_\chi^{-1} G_\chi$ are rank deficient. This means that joint interpolation and deghosting of aliased seismic data by using only one component (such as pressure, for example) is not possible. However, for the equations that are set forth above, only the invertibility of the sum of the matrices is needed, which is a more relaxed condition. Therefore, there is the potential of joint deghosting and interpolation of aliased data with a multi-component streamer.

The signal-to-noise ratio (SNR) for the estimated upgoing wavefield (called "SNR$_{P_{U,WLS}}$"), which is a scalar number, even when the signal and noise are vector data, may be described as follows:

$$\text{SNR}_{P_{U,WLS}} = P_{U,WLS}^H C_{N_{U,WLS}}^{-1} P_{U,WLS}. \quad \text{Eq. 30}$$

It follows that the SNR$_{P_{U,WLS}}$ on the estimated upgoing wavefield is the algebraic sum of the SNRs of each of the measurements, as described below:

$$\text{SNR}_{P_{U,WLS}} = \sum_{\chi=p,z,y,x} \text{SNR}_\chi, \quad \text{Eq. 31}$$

where the SNR for each of the measurement components is given as below in accordance with the SNR definition in Eq. 30:

$$\text{SNR}_\chi = (G_\chi P_U)^H C_\chi^{-1}(G_\chi P_U). \quad \text{Eq. 32}$$

If the noises on different streamers 30 are statistically uncorrelated, then the covariance matrices are diagonal. Furthermore, at a given frequency and inline wavenumber, if the strength of the noise on different streamers is comparable, then each covariance matrix is described only by the corresponding variance. In this case, the weighted least squares estimate of the upgoing wavefield (called "$\hat{P}_{U,WLS}$") may be described as follows:

$$\hat{P}_{U,WLS} = \left( \sum_{\chi=p,z,y,x} \frac{G_\chi^H G_\chi}{\sigma_\chi^2} \right)^{-1} \left( \sum_{\chi=p,z,y,x} \frac{G_\chi^H M_\chi}{\sigma_\chi^2} \right). \quad \text{Eq. 33}$$

Figure 4:
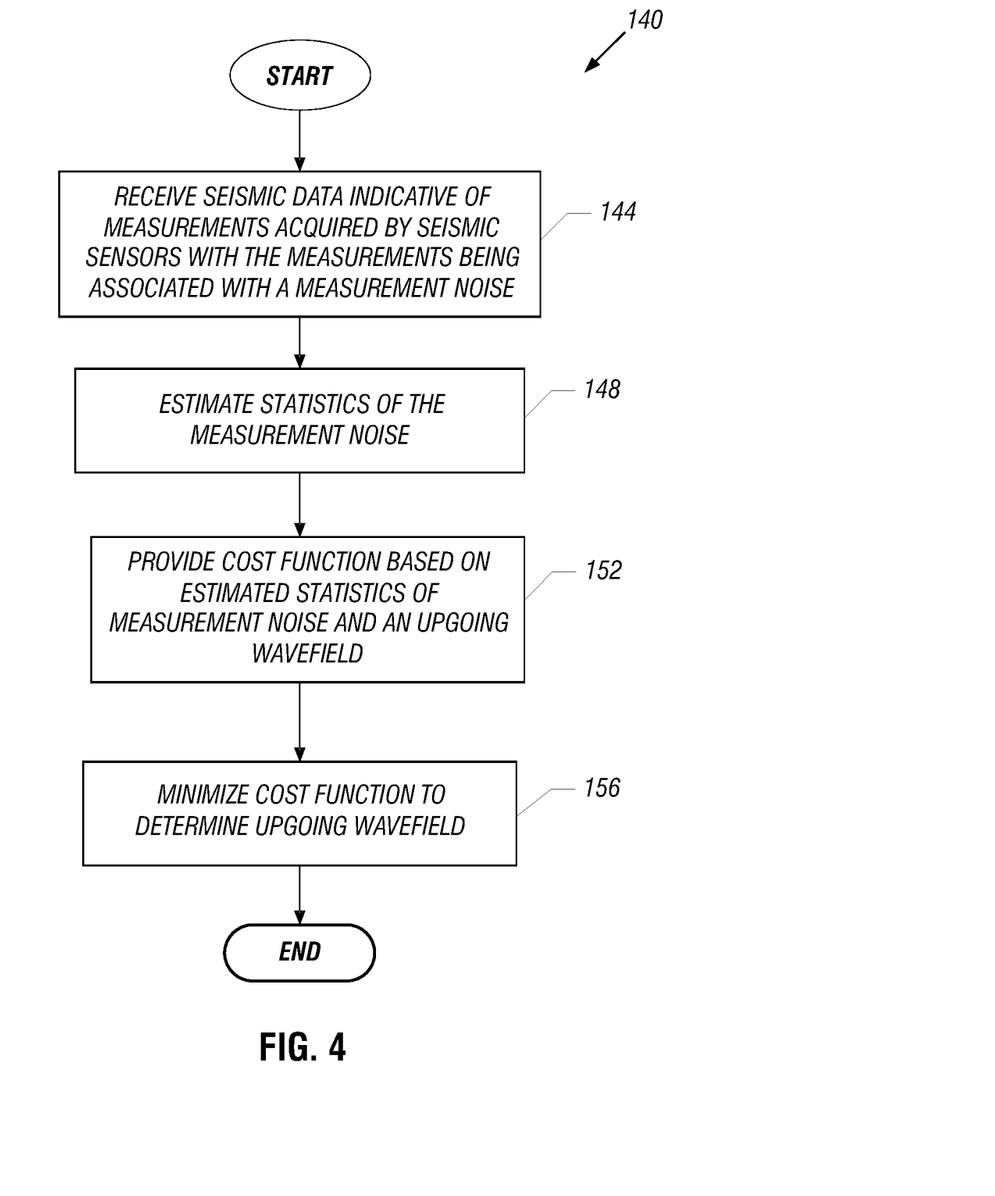

Thus, referring to FIG. 4, in accordance with embodiments of the invention, a technique 140 for determining an upgoing wavefield includes receiving (block 144) seismic data, which are indicative of measurements acquired by seismic sensors. The technique includes estimating (block 148) statistics of a measurement noise, which is associated with the seismic data and providing (block 152) a cost function based on estimated statistics of the measurement noise and an upgoing wavefield. The cost function is minimized, pursuant to block 156, to determine the upgoing wavefield.

Figure 5:
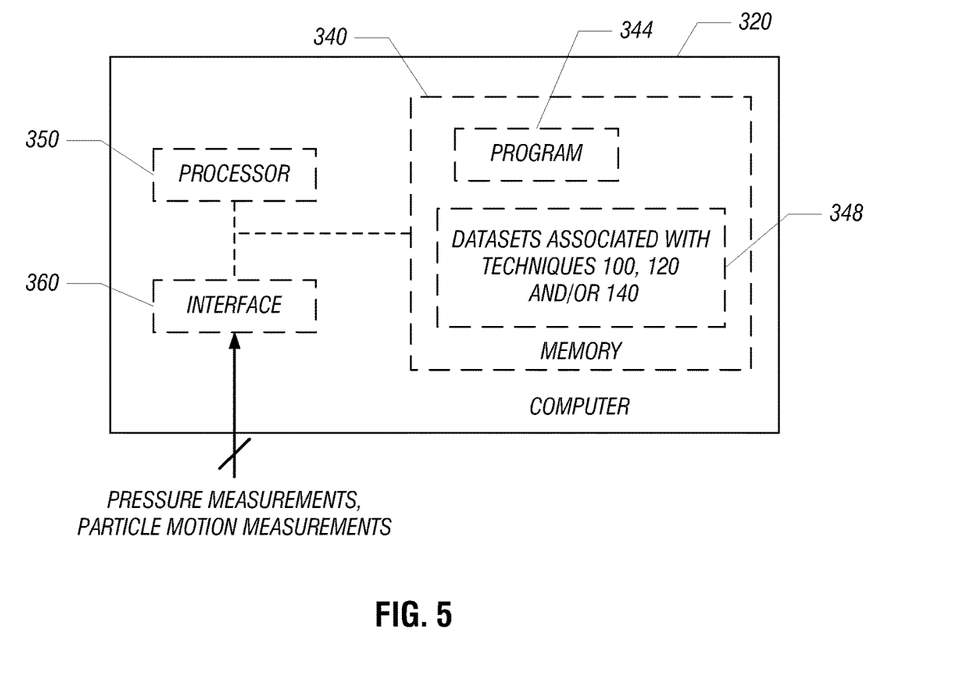
FIG. 5 is a schematic diagram of a data processing system according to an embodiment of the invention.

Referring to FIG. 5, in accordance with some embodiments of the invention, a processing system 320 may perform at least part of the techniques that are disclosed herein, such as one or more parts of the techniques 100, 120 and/or 140, for such purposes as jointly deghosting and interpolating seismic data. More specifically, the processing system 320 may process seismic data for purposes of estimating at least one characteristic of measurement noise and deghosting the seismic data based at least in part on the characteristic(s). The processing system 320 may be located on one of the streamers 30, on each streamer 30, distributed among the streamers 30, on the seismic source 104, on the survey vessel 20, and remote land-based facility, distributed on a single or several processing systems, etc. Thus, many variations are contemplated and are within the scope of the appended claims.

In accordance with some embodiments of the invention, the system 320 may include a processor 350, such as one or more microprocessors and/or microcontrollers computing subsystems, etc. The processor 350 may be located at one station or may be distributed over several stations.

The processor 350 may be coupled to a communication interface 360 for purposes of receiving seismic data, which are indicative of pressure measurements and particle motion measurements, which are acquired by the seismic sensors 58 (see FIG. 1). As a non-limiting example, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the system 320 and may store, for example, various input and/or output data sets 348 involved with the techniques that are described herein. The memory 340 may store program instructions 344, which when executed by the processor 350, may cause the processor 350 to perform at least part of the techniques that are described herein, such as at least one or more of the techniques 100, 120 and/or 140, for example, and display results obtained via the technique(s) on a display (not shown in FIG. 5) of the system 320, in accordance with some embodiments of the invention.

Other embodiments are contemplated and are within the scope of the appended claims. For example, in accordance with other embodiments of the invention, the systems and techniques that are disclosed herein may be used to deghost and interpolate seismic data that are acquired from seismic sensors that are not towed. As non-limiting examples, the seismic sensors may therefore alternatively be land-based seismic sensors, borehole-deployed seismic sensors, seabed-deployed seismic sensors, etc., depending on the particular embodiment of the invention.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A seismic streaming method for providing an interpolated and unbiased estimate of an upgoing wavefield comprising: placing one or more seismic sensors along one or more unevenly spaced receiver positions in a cross-line direction of a seismic streamer;
   receiving seismic data indicative of measurements acquired by the one or more unevenly spaced seismic sensors, the measurements being associated with a measurement noise; estimating at least one characteristic of the measurement noise;
   deghosting the seismic data, the deghosting producing a wavefield corresponding to a propagation direction based at least in part on a weighted least-squares estimate of the upgoing wavefield causing at least one noisier component of the estimate to be de-emphasized; and
   simultaneously interpolating the wavefield and performing the deghosting, wherein the simultaneously interpolating comprises processing the seismic data on a processor-based machine and wherein processing the seismic data includes processing to determine an interpolated and unbiased estimate of the upgoing wavefield as a product of the deghosting and concurrently interpolate the upgoing wavefield with the deghosting.

2. The method of claim 1, wherein
   the act of estimating the characteristic comprises estimating a probability distribution of the measurement noise, and
   the act of deghosting comprises deghosting the seismic data based at least in part on the probability distribution of the measurement noise.

3. The method of claim 2, wherein the act of estimating the probability distribution of the measurement noise comprises providing a model of the measurement noise.

4. The method of claim 1, wherein the act of deghosting comprises:
   determining a cost function that is a function of an upgoing wavefield and a characteristic of the measurement noise; and
   minimizing the cost function to determine the upgoing wavefield.

5. The method of claim 1, wherein the measurements comprise irregularly-spaced crossline measurements relative to an inline direction in which a streamer is towed.

6. The method of claim 1, wherein the act of deghosting comprises providing deghosted data having an associated evenly sampled spacing.

7. The method of claim 1, wherein the deghosting assumes that the measurements are each finite in number.

8. The method of claim 1, wherein simultaneously interpolating the wavefield and performing the deghosting is based upon, at least in part, a plurality of equations relating a deghosting operator, the wavefield and the measurement noise to determine the wavefield at interpolated positions.

9. A seismic streaming system for providing an interpolated and unbiased estimate of an upgoing wavefield comprising: one or more seismic sensors placed along one or more unevenly spaced receiver positions in a cross-line direction of a seismic streamer;
   an interface to receive seismic data indicative of measurements acquired by seismic sensors, the measurements being associated with a measurement noise; and a processor to process the seismic data to: estimate at least one characteristic of the measurement noise;

deghost the seismic data based at least in part on the measurement noise to produce a wavefield corresponding to a propagation direction based at least in part on a weighted least-squares estimate of the upgoing wavefield causing at least one noisier component of the estimate to be de-emphasized;

and process the seismic data to simultaneously interpolate the wavefield and perform the deghosting, and wherein processing the seismic data includes processing to determine an interpolated and unbiased estimate of the upgoing wavefield as a product of the deghosting and concurrently interpolate the upgoing wavefield with the deghosting.

10. The system of claim 9, wherein the processor is adapted to process the seismic data to estimate a probability distribution of the measurement noise and deghost the seismic data based at least in part on the estimated probability distribution.

11. The system of claim 10, wherein the processor is adapted to use a model of the measurement noise to estimate the probability distribution.

12. The system of claim 9, wherein the processor is adapted to process the seismic data to minimize a cost function that is a function of an upgoing wavefield and the measurement noise to determine the upgoing wavefield.

13. The system of claim 9, wherein the measurements comprise irregularly-spaced crossline measurements relative to an inline direction in which a streamer is towed.

14. The system of claim 9, wherein the measurements are associated with an uneven spacing.

15. The system of claim 9, wherein the processing by the processor assumes that the measurements are finite in number.

16. The system of claim 9, further comprising: at least one streamer comprising the seismic sensors; and a vessel to tow said at least one seismic streamer.

* * * * *